Jan. 1, 1963     C. S. AXTELL     3,071,212

MAGNETIC BRAKE ASSEMBLY

Filed Jan. 3, 1961

INVENTOR.
CLIVE S. AXTELL
BY *Frank C. Parker*
*David E. Dougherty*
ATTORNEYS

3,071,212
MAGNETIC BRAKE ASSEMBLY

Clive S. Axtell, Henrietta, N.Y., assignor to Bausch & Lomb Incorporated, Rochester, N.Y., a corporation of New York
Filed Jan. 3, 1961, Ser. No. 80,461
2 Claims. (Cl. 188—165)

This invention relates to a novel magnetic brake assembly of the type used to vary the frictional drag between a stationary member and a movable member, and, more particularly, to a novel magnetic brake assembly for use in a stereoscopic viewer or the like.

In stereoscopic viewing for purposes of photographic image interpretation, mensuration, mapping, contouring and other photogrammetric determinations, two photographs comprising a stereo pair are oriented, either mechanically or optically, to present an image to each eye of the observer. When properly oriented the two images fuse and a mental model of the original photographic subject is created, this model is complete with the third dimension re-created. During examination of the photography, it is desirable and often imperative to scan various areas of the photography while preventing the loss of mutual orientation. The scanning is accomplished by clamping the photography on a scanning member and then moving the scanning member.

Since it is sometimes necessary to examine stereoscopic photography aboard a ship, plane or other moving vehicle, it is particularly advantageous in overcoming the forces imparted by the rolling of a ship or movement of a vehicle, to have a positive adjustable control over the frictional drag between the scanning member and a fixed base member.

The magnetic brake according to the present invention includes a magnetic and a non-magnetic drag assembly for controlling the frictional drag between a scanning member and a fixed base member, thereby allowing the scanning member to be locked in position while adjusting the viewing instrument, or while examining an area increment. The magnetic brake also allows for translational movement of the scanning member in a manner that is not affected by the movement of the fixed base member caused by the roll of the ship or the movement of the vehicle within which the device is carried. The translational movement is achieved by overcoming a preselected frictional drag, and hence, the device is not subject to changes caused by lesser forces.

The magnetic brake made in accordance with the present invention may be used in any device having a movable member and a stationary member. However, it is particularly well suited for use in devices requiring the movable member to be locked in a fixed position with respect to the stationary member and requiring a positive control over the frictional drag between the movable member and the stationary member when the members are not in a locked relation.

An additional advantage is provided in the present invention by the use of a magnetic shunt. The use of the magentic shunt allows a greater change in frictional drag for the same change in air gap distance between the magnet and its cooperating member.

The present invention provides a novel magnetic brake assembly having a smooth adjusting mechanism which is durable and which is relatively inexpensive to manufacture.

Briefly, the invention comprises a plate of magnetic flux conducting material, such as iron or alloys of good magnetic permeability, and a permanent magnet adjustably mounted within a non-magnetic housing. The permanent magnet includes a magnetic shunt therein to reduce the air gap distance between the poles of the permanent magnet. The magnetic attraction is varied by changing the position of the magnet with respect to the plate in order to adjust the air gap distance therebetween. The adjustment is made in small increments since the magnetic attraction is related inversely to the square of the air gap distance. As the air gap distance is decreased, the magnetic force pulling the non-magnetic housing against the plate increases, and thus the frictional drag which must be overcome to effect translational movement is increased. Decreasing the air gap distance until the permanent magnet is brought into actual contact with the plate provides a relatively locked condition.

The invention will now be described in detail in connection with the drawings in which.

Figure 1:
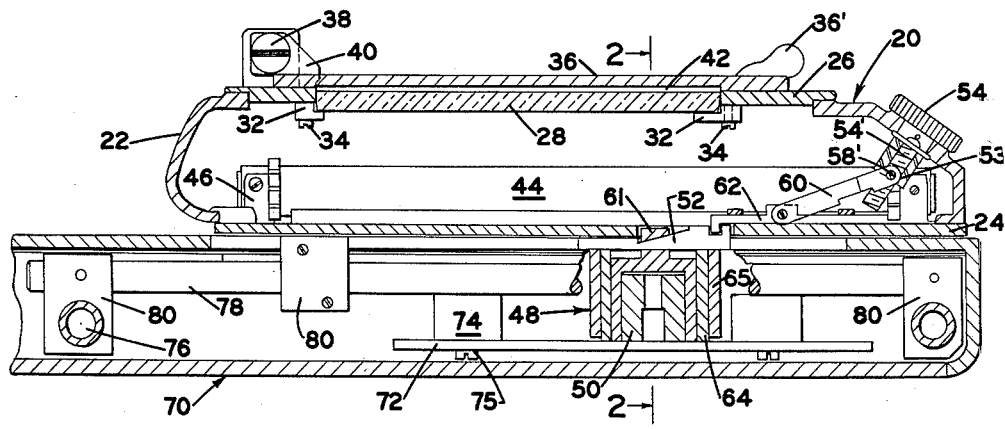
FIG. 1 shows a side view of a stereoscopic scanning device including a magnetic brake assembly according to this invention.
Figure 2:
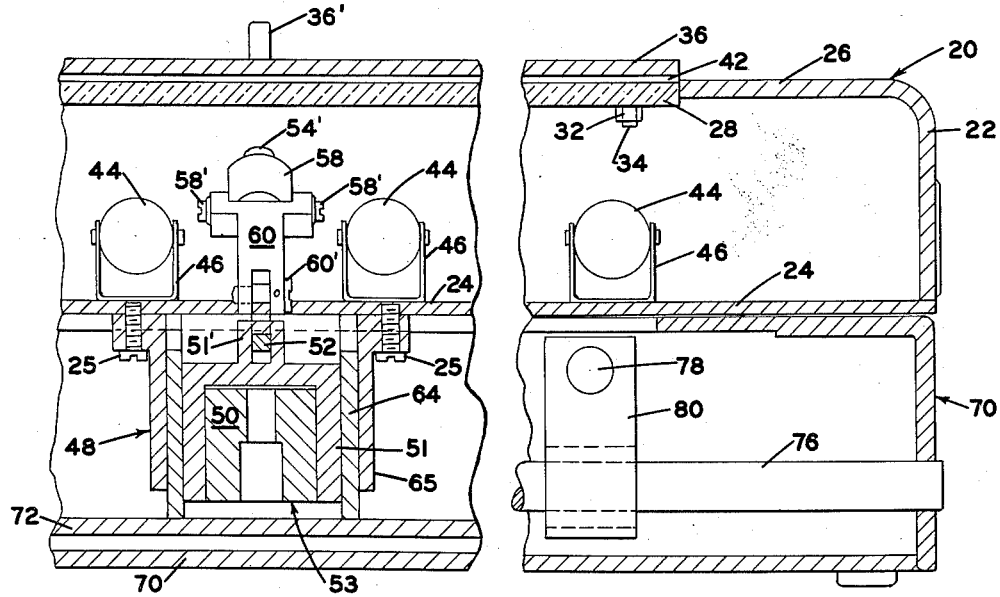
FIG. 2 shows a fragmentary end view of the device shown in FIG. 1 including an enlarged cross sectional view of the brake assembly taken along the line 2—2.

Referring now more particularly to the drawings, a magnetic brake assembly according to the present invention is shown in conjunction with a stereoscopic viewer. A scanning member 20 of a stereoscopic viewer comprises a generally hollow housing 22, having a base 24, and a top portion 26. The top portion 26 includes a translucent plate 28 attached thereto by the brackets 32 and screws 34. A transparent cover 36 is pivotally mounted to the top portion 26 by a pivot 38 and bracket 40. A pair of transparencies 42 are placed on the translucent plate and held in a fixed position thereon by the transparent cover 36 which, during insertion of the transparencies 42, is tilted upwardly by the handle 36' and then lowered to clamp the transparencies 42 in position. The transparencies 42 are illuminated by fluorescent tubes 44 which are mounted under the translucent plate 28. The fluorescent tubes 44 are mounted in the base of the scanning member 20 by clamps 46 which may act as the electrical contacts for a power source (not shown) to illuminate the fluorescent tubes 44.

A magnetic brake assembly generally designated as 48 is carried by the scanning member 20 and is mounted on the base 24 thereof by screws 25 so that the magnetic brake assembly 48 extends into a generally hollow stationary member 70. The brake assembly 48 comprises a permanent magnet 50 which is carried by a carrier member 51 of non-magnetic material forming an inner magnetic assembly 53. The carrier ring 51 has a lifter assembly 51' which is part of the casting of the carrier member 51. The lifter assembly 51' is engaged by a cam 52 which allows the inner magnetic assembly 53 to be raised or lowered within an annular non-magnetic housing 64 by the sliding movement of the cam 52. The cam 52 rides on the annular ring 64 so that the weight of the inner magnetic assembly 53 exerts a downward force on the annular ring 64 thereby pressing it into engagement with the plate 72. The magnetic attraction between the permanent magnet 50 and the plate 72 also exerts a downward force on the annular ring 64 to increase the friction between the ring 64 and the plate 72. An outer housing 65 is mounted on the base 24 of the scanning member 20 in order to move the magnetic assembly 48 within its translational limits.

The cam 52 is actuated by rotating a knob 54 mounted on the front of the scanning member 20. A threaded shaft 54' extending from the knob 54 carries a nut 58 which is raised or lowered by rotation of the knob 54. A link 60 is attached to the nut 58 by screws 58' so that the upward movement of the nut 58 exerts a translational movement through the link 60 to the second link 62 which moves the cam 52, lowering the magnetic inner assembly 53. Link 60 is attached to link 62 by a bolt 60'.

The permanent magnet 50 is rigidly mounted within the non-magnetic carrier ring 51 by cementing it therein or by set screws (not shown) in a manner so that the face of the permanent magnet 50 is flush with or protruding beyond the face of the carrier ring 51. The carrier ring 51 is slidably mounted within the non-magnetic annular ring 64 in order to allow for raising and lowering the magnet 50.

The carrier ring 51 is normally of non-magnetic material having a smooth surface and provides a sliding fit between the carrier ring 51 and the annular ring 64. The permanent magnet normally has a rough surface which is not readily machined and it has been found desirable to mount the permanent magnet 50 in the carrier ring 51 in the manner shown, to gain the advantage of a chatter-free adjustment and consequently improved sensitivity in controlling the frictional drag. Since the face of the magnet 50 is flush with or protruding beyond the face of the carrier ring 51, the magnet 50 when lowered to its lower limit will be in contact with the plate 72 to provide a relatively locked arrangement.

The plate 72 is rigidly mounted in the hollow stationary member 70 by brackets 74 and screws 75. Also mounted in the hollow stationary member 70 are a pair of transverse rods 76 and longitudinal rods 78 on which the scanning member 20 is mounted by roller assemblies 80 for translational movement with respect to the stationary member 70.

In operation, the permanent magnet 50 may be raised or lowered by turning the knob 54, thereby actuating the cam 52 which raises or lowers the lifter 51' thereby reciprocating the magnet 50 within the non-magnetic housing 64.

For maximum braking action between the brake mechanism 48 and the plate 72, the knob 54 is rotated in a clockwise manner to raise the link 60, moving the link 62 and the cam 52 to the right which acts on the lifter 51' lowering the magnet 50 to actually engage the plate 72.

To reduce the frictional drag between the scanning member 20 and the stationary member 70, the handle 54 is rotated in a counter clockwise direction which lowers the nut 58, moving the link 60 and link 62 to the left thereby raising the magnet 50 by the desired amount. Under these circumstances, the magnet 50 is withdrawn from engagement with the plate 72 and it is the non-magnetic housing 64 which frictionally engages the plate 72. The non-magnetic housing 64 is forced against the plate 72 by the magnetic force of attraction between the magnet 50 and the plate 72.

Figure 3:
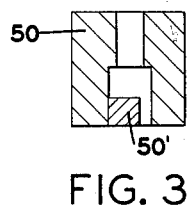
FIG. 3 is a cross-sectional view of the permanent magnet having a magnetic shunt therein.

The force of attraction between the magnet 50 and the plate 72 is inversely related to the square of the air gap distance which allows for a relatively large change in the magnetic field intensity with respect to a relatively small change in air gap distance.

Where the lift of the braking member is limited by mechanical features thereby limiting the change in air gap distance, the range of magnetic drag can be extended by the use of a magnetic shunt 50'. As shown in FIG. 3, a magnetic shunt 50' of magnetic permeable material is cemented to one pole of the permanent magnet in order to reduce the air gap distance between the two poles. It has been found desirable in the present application to place a magnetic shunt 50' in the permanent magnet 50 and thereby reduce the distance between poles of the permanent magnet 50 to approximately one-half the maximum air gap distance between the permanent magnet 50 and the plate 72.

It is contemplated that changes and modifications may be made in the present invention without departing from the spirit or scope thereof.

What is claimed is:

1. A magnetic brake assembly for use in a stereoscopic viewer or the like comprising a stationary member and a movable member, said movable member slidably mounted on said stationary member for translational movement, said movable member including a permanent magnet, and a non-magnetic housing, said permanent magnet disposed in sliding contact within said housing, a magnetic permeable member disposed between the poles of said permanent magnet to form a magnetic shunt therein to thereby reduce the effective air gap distance between the poles of said permanent magnet, said stationary member including a plate of magnetic flux conducting material, said non-magnetic housing of said movable member slidably engaging said plate of said stationary member, and adjusting means for varying the frictional drag between said movable member and said stationary member, said permanent magnet contacting said plate at a locking position of said adjusting means to thereby provide a relatively locked relation between said permanent magnet and said plate.

2. A magnetic brake assembly for use in a stereoscopic viewer or the like comprising a stationary member and a movable member, said movable member including a non-magnetic housing, a carrier member disposed in sliding contact with said housing and a permanent magnet disposed within said carrier member, a magnetic permeable member disposed between the poles of said magnet to form a magnetic shunt therein to thereby reduce the effective air gap distance between the poles of said permanent magnet, said stationary member including a plate of magnetic flux conducting material, said non-magnetic housing slidably engaging said plate, and means including said permanent magnet forcing said housing against said plate, and means adjusting the air gap distance between said permanent magnet and said plate for varying the frictional drag between said movable member and said plate, the maximum distance between said permanent magnet and said plate equal to approximately twice the effective air gap distance between the poles of said shunted permanent magnet, and said permanent magnet contacting said plate at a locking position of said adjusting means to thereby provide a relatively locked relation between said permanent magnet and said plate.

References Cited in the file of this patent

UNITED STATES PATENTS

| | | |
|---|---|---|
| 1,778,481 | Boucher | Oct. 14, 1930 |
| 2,165,123 | Ballantine | July 4, 1939 |
| 2,492,238 | Roof | Dec. 27, 1949 |
| 2,673,626 | Bastin | Mar. 30, 1954 |